| (12) | United States Patent<br>Leibinger | (10) Patent No.: US 9,938,188 B2<br>(45) Date of Patent: Apr. 10, 2018 |
|---|---|---|

(54) METHOD AND APPARATUS FOR BAKING CLINKER

(71) Applicant: Südbayerisches Portland-Zementwerk Gebr. Wiesböck & Co. GmbH, Rohrdorf (DE)

(72) Inventor: Helmut Leibinger, Ried im Innkries (AT)

(73) Assignee: SUDBAYERISCHES PORTLAND-ZEMENTWERK GEBR. WIESBOCK & CO. GMBH, Rohrdorf (DE)

( * ) Notice: Subject to any disclaimer, the term of this patent is extended or adjusted under 35 U.S.C. 154(b) by 177 days.

(21) Appl. No.: 14/091,126

(22) Filed: Nov. 26, 2013

(65) Prior Publication Data

US 2014/0174324 A1    Jun. 26, 2014

Related U.S. Application Data

(63) Continuation of application No. PCT/EP2012/058942, filed on May 14, 2012.

(30) Foreign Application Priority Data

May 27, 2011   (DE) .......................... 10 2011 050 694
Aug. 10, 2011   (DE) .......................... 10 2011 052 561

(51) Int. Cl.
   *C04B 7/47*   (2006.01)
   *C04B 7/44*   (2006.01)
   (Continued)

(52) U.S. Cl.
   CPC ................ *C04B 7/47* (2013.01); *C04B 7/364* (2013.01); *C04B 7/365* (2013.01); *C04B 7/432* (2013.01);
   (Continued)

(58) Field of Classification Search
   CPC ......... Y02P 40/123; C04B 7/47; C04B 7/475; C04B 2/10; C04B 7/364; C04B 7/365;
   (Continued)

(56) References Cited

U.S. PATENT DOCUMENTS 3,667,133 A * 6/1972 Lincoln ............... F27D 15/0213
                                                            165/110
5,216,884 A * 6/1993 Holsiepe ................. C04B 7/475
                                                            60/648

(Continued)

FOREIGN PATENT DOCUMENTS

| CH | 689 830 A5 | 12/1999 |
|---|---|---|
| DE | 25 58 722 | 7/1976 |

(Continued)

OTHER PUBLICATIONS

Alkateb et al., "Methods and Executions of Electrostatic Precipitator and Its Fundamental Plan", Apr. 1, 2016, Journal of Environmental Science, Computer Science and Engineering and Technology.*

(Continued)

*Primary Examiner* — Steven B McAllister
*Assistant Examiner* — Steven Anderson, II
(74) *Attorney, Agent, or Firm* — Norton Rose Fulbright US LLP

(57) ABSTRACT

To produce cement clinker by baking of raw meal in a kiln, use is conventionally made of a raw meal preheater in which the heat of the flue gas emerging from the kiln is transferred to the raw meal. In order to remove impurities which accumulate in circulation between the kiln and the raw meal preheater, a part of the flue gas is extracted from the kiln, bypassing the raw meal preheater. The heat generated during the baking of cement clinker can be used particularly efficiently if the flue gases extracted and diverted past the raw meal preheater are used in a boiler to generate hot steam which can subsequently be expanded in a turbine.

8 Claims, 2 Drawing Sheets

(51) Int. Cl.
*C04B 7/43* (2006.01)
*C04B 7/36* (2006.01)
*F27B 7/20* (2006.01)
*F27D 17/00* (2006.01)

(52) U.S. Cl.
CPC ............... *C04B 7/44* (2013.01); *C04B 7/475* (2013.01); *F27B 7/2025* (2013.01); *F27D 17/004* (2013.01); *F27D 17/008* (2013.01); *Y02P 40/123* (2015.11)

(58) Field of Classification Search
CPC .. C04B 7/43; C04B 7/432; C04B 7/44; C04B 7/60; F23G 7/066; F26B 23/022; F27B 2005/166; F27B 5/16; F27B 7/2025; F27D 2015/0233; F27D 17/004; F27D 17/008
See application file for complete search history.

(56) References Cited

U.S. PATENT DOCUMENTS

| | | | | |
|---|---|---|---|---|
| 5,297,729 | A * | 3/1994 | Scullion | F23C 3/006 126/110 C |
| 2003/0105381 | A1* | 6/2003 | Eckert | B01D 53/70 588/316 |
| 2003/0188486 | A1* | 10/2003 | Tanaka | B01F 3/04049 48/189.6 |
| 2007/0178418 | A1* | 8/2007 | Meyer | C04B 7/47 432/14 |
| 2009/0255444 | A1* | 10/2009 | Martinez Vera | B01D 53/62 106/744 |

FOREIGN PATENT DOCUMENTS

| | | | |
|---|---|---|---|
| DE | 40 41 251 A1 | 6/1992 | |
| EP | 0 492 133 | 11/1991 | |
| EP | 0534225 A1 * | 3/1993 | ............... C04B 7/43 |
| EP | 2 294 028 B1 | 3/2011 | |
| GB | 1366574 A * | 9/1974 | ............. B03C 3/014 |

OTHER PUBLICATIONS

International Preliminary Report on Patentability in International Application No. PCT/EP2012/058942 dated Dec. 2, 2013.
Search Report and Written Opinion in International Application No. PCT/EP2012/058942 dated Dec. 6, 2012.
Sutou, et al., "A new chloride-bypass system with stable kiln operation and recycling of waste" ZKG International. 54(3):121-128, 2001.

* cited by examiner

METHOD AND APPARATUS FOR BAKING CLINKER

PRIORITY CLAIM

This application is a continuation of pending International Application No. PCT/EP2012/058942 filed on May 14, 2012, which designates the United States and claims priority from German Patent Applications No. 10 2011 050 694 filed on May 27, 2011 and No. 10 2011 052561 filed on Aug. 10, 2011, all of which are incorporated by reference in their entireties.

BACKGROUND OF THE INVENTION

1. Field of the Invention

The invention relates to an apparatus and a method for manufacturing cement clinker, also referred to as clinker. The apparatus comprises a kiln for transforming the raw meal into clinker and at least a first heat exchanger for heating a fluid, in order to subsequently expand it in at least one turbine.

2. Description of Relevant Art

Clinker is produced by baking the raw meal in a kiln. This requires a temperature of about 1450° C. fuels such as coal, natural gas, petroleum, petroleum products (including plastic residues), paper or wood or other substitute fuels are burned in the kiln to produce this temperature.

Patent CH 689 830 A5 describes the production of clinker with simultaneous power generation. The preheated raw meal is baked in a rotary kiln to produce clinker as usual. The flue gases generated in the kiln are extracted from the kiln and the heat stored therein is used initially to preheat the raw meal. The flue gases cooled down in this process to about 600° C.-1200° C. are subsequently fed to a heat exchanger to produce superheated steam, which is then expanded in a turbine. The turbine drives a generator, such that the mechanical energy released during expansion is at least partially made available for use as electrical energy.

The published patent application DE 25 58 722 also describes a possibility for converting the heat energy contained in flue gases from the clinker process into electrical energy. This option uses the flue gases to preheat raw meal and produce steam. As usual, the raw meal is preheated in a heat exchanger tower with cyclone separators. A steam boiler for generating steam is arranged in the flue gas flow between the cyclone separators.

The raw meal usually consists of a mixture of limestone and clay or marl, often with iron ore and/or sand. In this way, chlorides, alkali metal compounds and sulphur compounds are also borne into the kiln with the raw meal. These impurities evaporate in the oven, leave it with the flue gas and then condense in the raw meal preheater and on the raw meal. A portion of the impurities are introduced back into the kiln with the raw meal, where they re-evaporate and leave the kiln with the flue gas to subsequently condense again. In this way, the impurities accumulate in the kiln and in the region of the raw meal preheater. This leads to a narrowing of the cross-section of the flue gas flow in the area where the contaminants condense. These impurities are therefore usually removed from the flue gas by means of a bypass system. These bypass systems remove a portion of the dust-laden kiln exhaust gases prior to entry into the raw meal preheater. However, there is a problem with subsequent processing of the dust accumulated from dedusting the bypass gases. The coarse dust can first be removed for instance from the bypass gas in a cyclone separator, before cooling the gas and then removing the fine dust in a fibrous filter. The coarse dust contains only a little chloride and can be fed into the kiln again. The fine dust has a high chloride content and can to a limited extent be added to the clinker, for instance during the cement milling process, without compromising the quality of the cement (cf. "A new chloride-bypass system with stable kiln operation and recycling of waste" Sutou et al., ZKG International, Vol. 54, No. 3, 2001, pp. 121-128). The problem of this solution is that the dust particles are needed as condensation nuclei and after coarse dust separation these condensation nuclei are no longer available in sufficient quantity.

SUMMARY OF THE INVENTION

The object of the invention is to provide an apparatus and method to enable better use of heat generated by baking clinker from raw meal.

This aim is achieved by an apparatus and a method according to the independent claims. Advantageous embodiments of the invention are specified in the dependent claims.

The apparatus for the production of clinker has at least a minimum of one kiln for baking the raw meal to convert it to clinker. The kiln has at least one outlet for flue gases, which is connected with at least one raw meal preheater in such a way that the heat stored in the flue gases coming from the outlet in the raw meal preheater is delivered to the raw meal. The preheated raw meal can then be fed to the kiln and burned there to form clinker. The device also has at least one branch for flue gases to divert a portion of the flue gases in order to remove impurities, i.e. a so-called bypass outlet. The bypass outlet can for example be arranged on the kiln or between the kiln and the raw meal preheater. To convert the heat stored in the flue gas into electric energy the apparatus has at least a first heat exchanger, in which the heat stored in the flue gas is transferred to the fluid so that it can then be expanded in a turbine. The turbine then drives, for example, a generator. In particular, the fluid can therefore be water or water vapour. According to the invention, the first heat exchanger is preferably connected to the branch, i.e. the bypass outlet, in such a manner that the heat from the diverted portion of the flue gas is supplied to the fluid. Thus, the amount of heat available for steam generation is increased per unit of time.

The term 'heat' denotes the thermal energy $Q=c(T, p, V)*m*T$, stored at a given temperature in an amount of a substance, wherein $c$ (T, p, v) describes the specific heat capacity, m the mass and T the temperature. As is customary, V and p stand for volume and pressure respectively. Heat can be partially transferred, for example in a heat exchanger, to a different material having lower temperature. Heat can be transferred from one substance to another substance and conveyed by transporting substances, for example with the stream of a flowing fluid. In such processes the term heat refers to the transferred and/or transported thermal energy within a time interval.

Preferably, the branch is connected to at least one mixing chamber in order to mix the diverted part of the exhaust gases with fresh air. Although the temperature of the flue gas is reduced as a result, for example in the order of magnitude of 450° C. (especially expedient 300°-500° C.), at these temperatures the chloride condenses on the dust particles and can be separated from the flue gas, for example by means of electric or ceramic filters. Nevertheless, this temperature is more than sufficient to efficiently heat the fluid mixed with the diverted and dedusted flue gas mixed with fresh air in the first heat exchanger.

Therefore, the mixing chamber preferably has an outlet that is connected to a hot-gas dust separator, for example a ceramic filter, to remove dust from the flue gases that have been blended with fresh air and therefore cooled.

As already described, the hot gas dust separator preferably has an outlet connected to an inlet of the first heat exchanger in order to heat the fluid in the first heat exchanger with the dust-free flue gas, i.e. heat is removed from the dedusted flue gas to generate the steam. The first heat exchanger can thus also be referred to as a chloride bypass boiler. The prior removal of dust means that the function of the chloride bypass boiler is not affected by dust, which could otherwise settle on heat exchange surfaces and shorten the life of the components of the chloride bypass boiler due to their abrasive properties.

The flue gas exiting the chloride bypass boiler is preferably recycled to the kiln. As a result, the residual heat contained in the flue gases and not transmitted to the fluid can on the one hand be utilised and on the other, fed into the conventional exhaust gas treatment, e.g. denitrification in an SCR plant. Accordingly, the chloride bypass boiler is preferably connected to the kiln in such a manner that flue gas exiting the chloride bypass boiler is returned to the kiln system.

More preferably, the flue gas leaving the chloride bypass boiler is used as a coolant for cooling clinker, heating it more. Therefore, the chloride bypass boiler is particularly preferred in connection with a clinker cooler whereby flue gases expelled from the first heat exchanger are blown via the clinker cooler into the kiln as secondary air. As a result, the residual heat still present in the flue gas after the chloride bypass boiler can be fed back into the oven.

Highly preferable is that at the least a second heat exchanger, e.g. a steam boiler, is connected to the first heat exchanger in such a manner that the fluid is heated sequentially in the two heat exchangers. The amount of heat supplied to the fluid and thus the energy (per unit of time) released during expansion of the fluid can thus be increased further. This solution involving a serial-type coupling of both heat exchangers has the advantage that only one turbine is required, compared with two fluids conveyed parallel. In addition, the achievable energy density of the fluid in the series circuit is greater than with a parallel coupling of heat exchangers, with the turbine having to expand a smaller flow volume.

For example, the fluid, e.g. water or steam (no further distinction to be made here), can be heated in one of the two heat exchangers, first to a first temperature ($T_1$), e.g. in the order of 250° C. (200° C.-300° C.) at a first pressure ($p_1$). Then, further heat is supplied to the fluid (300° C.-500° C.) to heat it, e.g. to a second temperature ($T_2$) e.g. 400° C. (300° C.-500° C.) at a second pressure ($p_2$). Preferably, the first pressure is greater than the second pressure, i.e. $p_1 > p_2$, simplifying the fluid feed to the downstream heat exchanger. The second heat exchanger can for instance be a steam boiler heated by flue gases exiting the raw meal preheater.

Preferably, the fluid supplied to the first and second heat exchangers is preheated in at least one third heat exchanger. In this way the heat stored in heat media, which have a lower temperature than the flue gases exiting the kiln and the raw meal preheater can be used effectively, i.e. the energy stored in the fluid (per time unit) can be increased further. For example, cooling air heated in a clinker cooler, so-called exhaust air, can be fed into the third heat exchanger as a heat source. Similarly, denitrified flue gases can be supplied to the third heat exchanger. Highly preferable is for the third heat exchanger to have at least two stages, with heat stored in denitrified flue gas supplied to the fluid in one of the stages and heat stored in exhaust air of the clinker cooler supplied to the fluid in another stage. For example, in a first stage the fluid can be heated from about 50° C. (30° C.-80° C.) with the heat of denitrified flue gases to about 115° C. (80° C.-150° C.). In a second stage, which may be spatially separated from the first stage, the fluid can then be heated to about 200° C. (150° C.-250° C.). During preheating, the fluid is preferably under a pressure in the order of about 20 to 30 bar. At this pressure and temperature, water, a suitable fluid, is still liquid. This is how supply fluid preheating can be easily differentiated from steam generation.

Heating of the fluid in the third heat exchanger occurs at a somewhat constant pressure of at least $p_3$, which is preferably greater than the pressure specified above for $p_1$ and/or $p_2$, simplifying feeding of the pre-heated fluid in the first and second heat exchanger.

The main process steps according to the invention can be summarised as follows:

1. Burn raw meal to produce clinker in a kiln.
2. Heat the raw meal in a raw meal preheater using flue gases from the kiln.
3. Divert a portion of the flue gases from the kiln in order to conduct them past the raw meal preheater.
4. Generate steam with the heat produced during the combustion process in the kiln, with the heat for producing the steam being extracted from the diverted flue gases.
5. Expand the vapour by means of at least one steam turbine.

BRIEF DESCRIPTION OF THE DRAWINGS

In the following, the invention will be described by way of example, without limitation of the general inventive concept, on examples of embodiment and with reference to the drawings.

Figure 1:
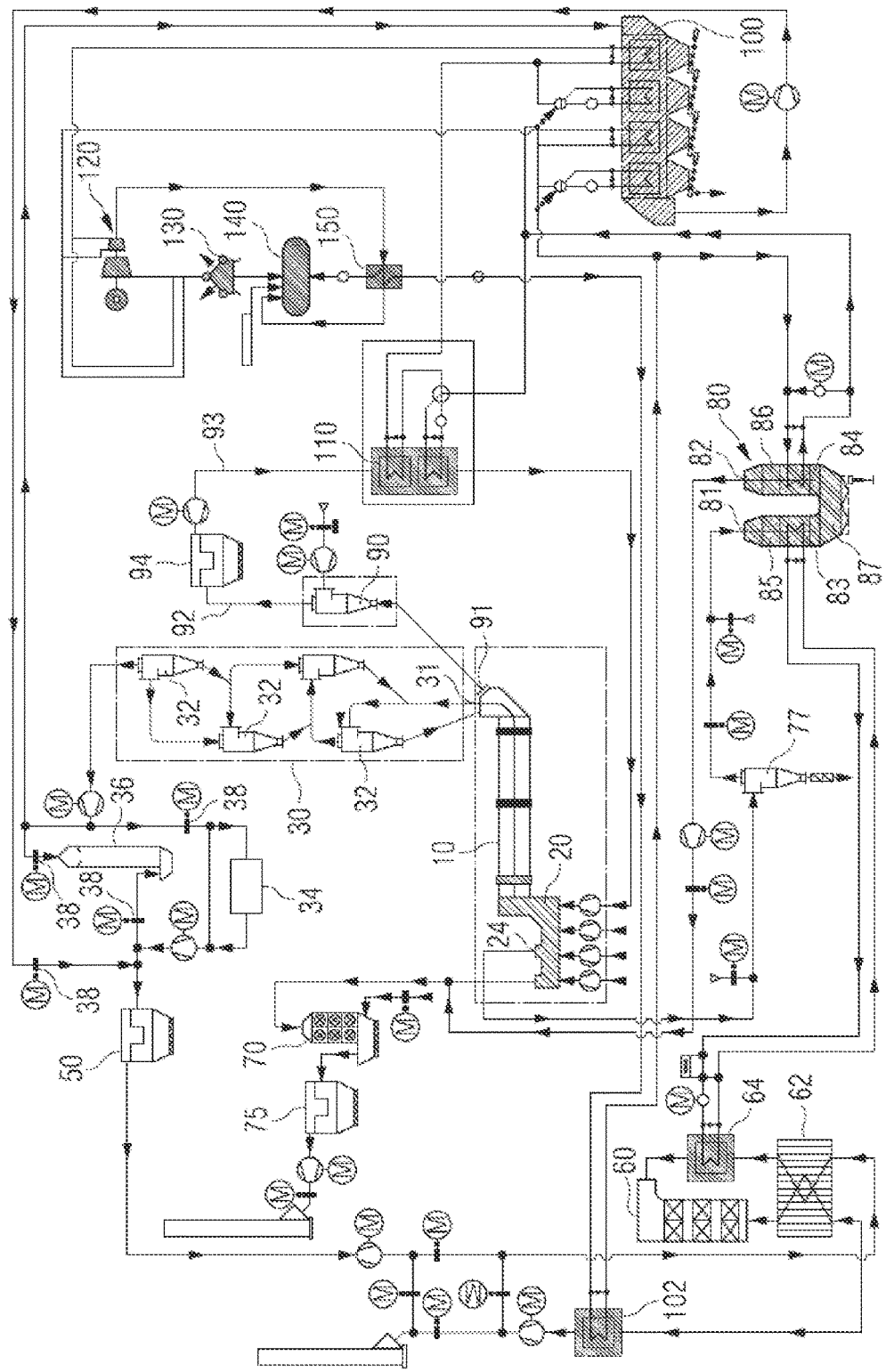
FIG. 1 shows an example of a flow diagram of an apparatus for baking clinker from raw meal.
Figure 2:
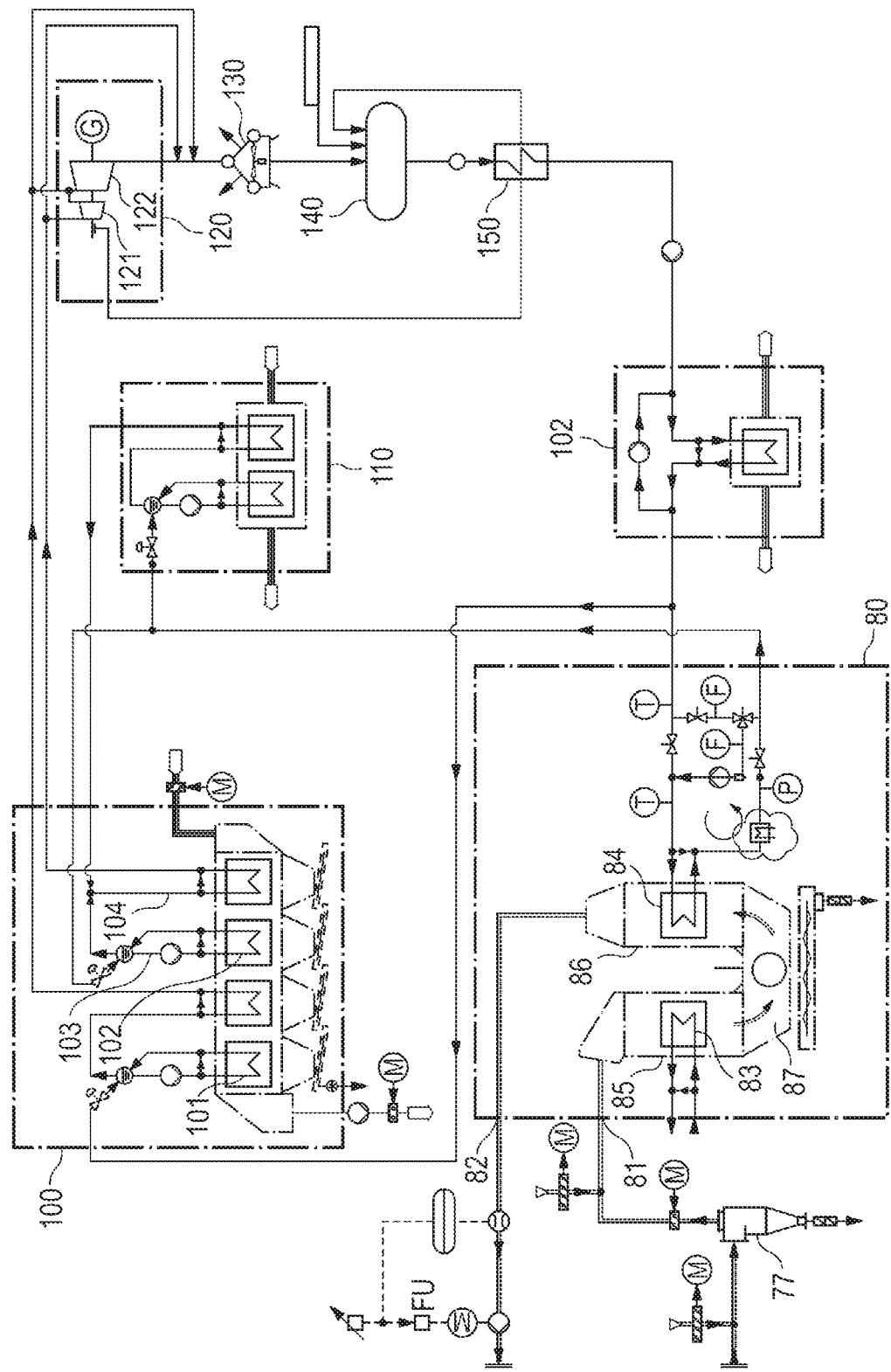
FIG. 2 shows details of the flow chart.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Core of the apparatus according to FIG. 1 is a rotary kiln 10 between a clinker cooler 20 and a heat exchanger tower 30. The rotary kiln 10 has one burner (not shown) projecting into the rotary kiln 10 from the side of the clinker cooler to generate the heat required for producing clinker by means of combustion in the rotary kiln 10. A main flow of flue gases generated during combustion leaves the rotary kiln 10 from an outlet 31 on the heat exchanger side. The outlet is connected to the heat exchange tower 30 as an example of a raw meal preheater. Reciprocally, the raw meal is introduced into the rotary kiln 10 from this side. As an example, the heat exchange tower 30 has here four cascaded interconnected cyclone separators 32 connected in series for preheating the raw meal using the heat of the flue gas and for removing the coarse particles from the flue gas. Any other number of cyclones could be cascaded as well.

In addition to the outlet 31, the kiln has a branch 91 for flue gases to divert a portion of the flue gases for separating impurities. The branch is therefore the beginning of a bypass line, a chloride bypass in the illustrated example. The diverted flue gas flow is denoted as a partial flue gas flow or bypass flow solely to distinguish it better from the main flue gas flow in particular.

The main flue gas flow coming from the heat exchanger tower 30 typically has a temperature of about 250-550° C., usually from 300 to 500° C. Before the flue gas is fed to a flue gas filter 50 for further dust removal, it is cooled to less than 150° C. On the one hand this makes it possible to drastically reduce the volume to be dedusted (per time unit) and the cheaper fabric filter technology can be used. In addition, heavy metals contained on the dust in the flue gases, such as mercury or thallium, condense during the cooling of the flue gases to less than 150° C. and the dust can be separated with this during dedusting. Consequently, the flue gas filter 50 can also be referred to as a cold trap. Provision is made for three options to cool the main flue gas flow:

(i) guiding the main flue gas flow to a boiler 100 in order to generate steam that is expanded in a turbine assembly 120 to drive for example a generator G.
(ii) guiding the main flue gas flow to a raw meal mill 34 for drying and preheating the material to be ground and
(iii) guiding the main flue gas flow to an evaporative cooler 36.

Provision is made in the respective lines for valves 38 to divide the flue gas flow into the three means of cooling. During normal operation, no or as little flue gas as possible should be cooled by the evaporative cooler 36, because the heat removed from the flue gas in the evaporative cooler 36 is no longer available as process heat. The evaporative cooler therefore preferably only has the function of an emergency cooler should it not be possible to use the boiler 100.

The heat contained in the diverted partial flue gas flow is also used to generate steam: For this purpose, the branch 91 is connected to a mixing chamber 90 in which the partial flue gas flow is mixed with fresh air. Chloride condenses on dust particles contained in the flue gas during this process. The mixing temperature is set in the order of 400° C. (about 350° C.-450° C.) and allows dust to be removed from the partial flue gas flow in a hot gas filter 94. The outlet of the mixing chamber is thus connected to the inlet of the hot gas filter 94; this is indicated by a line 92.

The dedusted partial flue gas flow is then fed to a heat exchanger 110, which is also referred to below as a chloride bypass boiler 110 (indicated by a compressor symbol and connecting line 93). Heat is transferred from the partial flue gas flow to water in the chloride bypass boiler 110 to generate steam, with the partial flue-gas flow cooled to about 230° C. The chloride bypass boiler 110 is connected to the clinker cooler 20, in particular with the area of the clinker cooler 20 where the clinker falling out of the kiln 10 are stored in order to cool the clinker with the partial flue gas flow, heating the partial flue gas flow. The partial flue gas flow is fed back into the kiln 10 via the clinker cooler 20 as secondary air. This allows one to dispense with separate flue gas purification of the partial flue gas flow, e.g. removal of nitrogen. Moreover, this reintroduction makes energetic sense as the heat stored in the partial flue gas flow after exiting the chloride bypass boiler 110 is fed back into the kiln.

The main flue gas flow is dedusted and denitrified. For this purpose, the main flue gas flow in the steam boiler 100 is cooled to about 170° C., preferably to less than 150° C. At this temperature, heavy metals contained in the flue gas condense on the dust and can be deposited with the dust in the downstream flue gas filter 50. The flue gas filter 50 thus has the function of a cold trap for heavy metals. The dedusted flue gas is supplied to an SCR plant 60 for catalytic denitrification of the flue gases. To do so it must be heated to at least 230° C. Therefore, coming from the flue gas filter 50 it is fed firstly into a recuperator 62, which is also fed a counterflow of flue gas that has been previously denitrified in the SCR system 50 so that heat is transferred from the denitrified gas to the flue gas to be denitrified. The flue gas leaving the recuperator that is to be denitrified is fed into another heat exchanger 64 in order to heat it further. The requisite heat for heating the flue gas is supplied to the next heat exchanger 64 via a so-called thermal oil acting as a heat transfer fluid. The flue gas heated in this way in two stages (first stage: recuperator 62; second stage, "second heat exchanger 64") is supplied to the SCR plant 60 and denitrified there The denitrified flue gas heats the flue gases to be denitrified in the recuperator 62 as previously described and is cooled accordingly. The flue gas is then cooled in a further heat exchanger 102, preferably to about 110° C. and can be discharged as indicated via a flue. The heat extracted from the flue gas in the heat exchanger 102 is used to preheat the feedwater for the boiler 100 and/or the chloride bypass boiler 110.

In addition, heat is removed from the rotary kiln 10 with the preferred continuous removal of clinker from the rotary kiln 10. This hot clinker, initially about 1450° C., is cooled in the clinker cooler 20. Air serves as the preferred coolant and in the simplest case, ambient air. The clinker cooler 20 is thus a heat exchanger. A portion of the air heated in the clinker cooler 20 is discharged from the clinker cooler via a so-called central air outlet 24. The thermal oil in its capacity as a heat transfer fluid is heated in a heat exchanger 80 with heat stored in the discharged air, hereinafter denoted as exhaust air, after coarse dedusting by a cyclone separator 77. The heat transferred to the heat transfer fluid can be transported over long distances with only minimal heat loss, especially to heat the flue gas to be denitrified to the temperature required for denitrification in the second heat exchanger 64.

The heat exchanger 80 has an inlet 81 for the exhaust air, which is first conveyed to the heat exchanger 80 via a first conduit 83 to heat the heat transfer fluid flowing through the first conduit 83. A second conduit 84, through which the exhaust air is conducted, is arranged subordinate to the first conduit 83. Another heat transfer fluid flows in the second conduit 84 and is heated by the exhaust air. In the example shown, the additional heat transfer fluid is water, which is pre-heated as feedwater for the boiler 100 and/or a boiler 110. The exhaust air exits the heat exchanger 80 through an outlet 82. The exhaust air is conveyed in a flow channel in the heat exchanger 80. The flow channel is for example U-shaped, i.e. has two free arms 85, 86 which are interconnected by an underlying transverse arm 87. One of the two lines 83, 84 is in each of the two free arms 85, 86. Deflecting the air in the region of the transverse arm 87 causes the clinker dust borne by the exhaust air to collect at the bottom of the transverse arm, where it can be separated.

The outlet 82 is connected to a further heat exchanger to control the temperature in the downstream flue gas filter 75. The filtered exhaust air is discharged through an implied fireplace.

Steam generation takes place in several stages. The feedwater is obtained mainly by condensation of steam expanded previously in the steam turbine assembly 120. For this purpose, provision is made for various condensors 130, 140, 150. Losses are preferably compensated with demineralized water. The feedwater at the outlet of the condenser 150 is about 55° C. and is removed from there and conveyed to the other heat exchanger 102 by means of a pump. There it is heated to about 135° C. (100° C.-150° C.) in a first stage using the heat of the main denitrified flue gas flow. During this process, some of the feedwater is recycled after it has left the heat exchanger, resulting in a constant temperature of about 110° C. (>100° C. to 150° C.) at the feedwater inlet of the heat exchanger 102. In this way, the flue gas emerging from the heat exchanger 102 has a temperature of at least about 110° C. (100° C. to 150° C.), preventing condensation from the water contained in the main flue gas flow. It is preferable for this temperature to be selected as low as possible, but high enough to prevent or reduce to a minimum the formation of condensation in the flue adjoining the heat exchanger 102.

A portion of the feedwater preheated in the heat exchanger 102 is fed directly to the boiler 100. The remaining part of the preheated feedwater in the heat exchanger 102 is heated further in the second conduit 84 of the heat exchanger 80 by the exhaust air from the clinker cooler further, for example to about 200° C. (150° C.-250° C.). Some of this portion of the feedwater is also fed to the boiler 100 and the remainder into the chloride bypass boiler 110.

The steam generated from the feedwater in the boiler 100 and the chloride bypass heater 110 is then fed to the turbine assembly 120. For this purpose, the boiler 100 has two conduit systems 101, 102. The first 101 of the two conduit systems is used to generate steam under relatively low pressure and relatively low temperature, e.g. about 200° C. (150°-250° C.) at about 4 bar (2-6 bar). This first conduit system 101 is arranged downstream from the second conduit system 102 in the main flue gas flow and is fed with feedwater pre-heated by the heat exchanger 102. Therefore, the second conduit system is used to generate steam at a much higher temperature, e.g. about 400° C. (300° C. or more), e.g. at about 15 bar (10-30 bar), preferably superheated steam. It is fed with feedwater coming from the heat exchanger 80 as follows: A first part of the feedwater coming from the heat exchanger 80 is heated in a first section 103 of the second conduit 102 of the steam boiler 100. The other part of the feedwater coming from heat exchanger 80 is heated to approx. 250° C. (200° C. to 300° C.) in the chloride bypass boiler 110 at about 10-30 bar. The two parts of the feedwater coming from the heat exchanger 80 heated in this manner are then heated to the final temperature of about 400° C. at about 10-30 bar in a second section 104 of the conduit 102 of the boiler 100 immediately downstream from the first section 103. Consequently, two vapour flows stream to the turbine assembly from the boiler 100: a first, which has been heated by the main flue gas flow in the first conduit 101 and a second, which has been heated in the second conduit 102 in conjunction with the chloride bybass boiler 110. The first vapour flow has a lower temperature and lower pressure in comparison with the second vapour flow. These two vapour flows are then expanded in the corresponding two-stage turbine assembly 120. The second vapour flow is initially expanded in a first turbine stage 121 to approximately the pressure of the first vapour stream. The two steam flows are then expanded together in a second turbine stage 122. The expanded steam is then condensed in a plurality of condensors 130, 140, 150. The water obtained in this manner can be resupplied to the feedwater preheating system from the heat exchangers 102 and 80.

It will be appreciated to those skilled in the art having the benefit of this disclosure that this invention is believed to provide a method and an apparatus for producing cement clinker. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS

10 Kiln, here as a rotary kiln
20 Clinker cooler
24 Centre air outlet
30 Heat exchanger tower
31 Outlet for primary flue gas stream
32 Cyclone separator
34 Raw meal mill
36 Evaporative cooler
38 Valve
50 Flue gas filter for particulate removal
60 SCR system
62 Recuperator/heat exchanger
64 (Second) heat exchanger
70 Cold trap/Cooler
75 Flue gas filter for particulate removal
77 Cyclone separator for coarse particulate matter
80 Heat exchanger
81 Exhaust air inlet
82 Exhaust air outlet
83 First heat transfer fluid line
84 Second heat transfer fluid line
85 Free arm
86 Free arm
87 Transverse arm
90 Mixing chamber
91 Branch for partial flue gas flow
92 Connection
93 Connection
94 Vapour particulate removal
100 Heat recovery boiler/Steam boiler
101 First conduit
102 Second conduit
103 First section of the first conduit
104 Second section of the second conduit
102 Heat exchanger for feedwater preheating
110 Vapour extraction boiler
120 Turbine assembly
121 First turbine stage
122 Second turbine stage

130 Condensor I
140 Condensor II
150 Condensor III

The invention claimed is:

1. An apparatus for manufacturing clinker, comprising:
a kiln configured to bake raw meal to convert the raw meal into clinker, the kiln having an outlet for flue gases and a branch for flue gases to divert a portion of the flue gases to separate contaminants from the diverted portion of the flue gases, the contaminants including chlorides,
a raw meal preheater connected to the outlet in such a manner that flue gases leaving the outlet will enter the raw meal preheater to heat the raw meal, and
a first heat exchanger configured to pressurize a fluid using heat generated during a combustion process in the kiln in order to subsequently expand the fluid in a turbine,
a hot gas dust separator having an inlet, and
a mixing chamber having a first inlet, a second inlet, and an outlet
wherein
(i) the first inlet of the mixing chamber is connected to the branch in such a manner that the diverted portion of the flue gas is mixed with fresh air entering the mixing chamber through the second inlet such that the diverted portion of the flue gas is cooled down to 350° C. to 450° C. by said mixing,
(ii) a connection between the outlet of the mixing chamber and the inlet of the hot gas dust separator directly connects the outlet of the mixing chamber in such a manner that the hot gas dust separator will receive the diverted portion of the flue gases at a temperature of 350° C. to 450° C., but not the non-diverted portion of the flue gas, and
(iii) an inlet of the first heat exchanger is connected to an outlet of the hot gas dust separator in such a manner that the first heat exchanger will receive the diverted portion of the flue gases after being dedusted in the hot gas dust separator and can transfer heat from the cooled and subsequently dedusted diverted portion of the flue gas to the fluid.

2. The apparatus according to claim 1, wherein the branch is configured to be connected to a mixing chamber to mix the diverted part of the exhaust gases with fresh air.

3. The apparatus according to claim 1 wherein the first heat exchanger is connected to the kiln such that exhaust gas leaving the first heat exchanger is fed to the kiln.

4. The apparatus according to claim 3 wherein the first heat exchanger is connected to a clinker cooler, and the configuration of the clinker cooler and the connection between the first heat exchanger and the clinker cooler are such that the clinker cooler can blow flue gas coming from the first heat exchanger into the kiln.

5. An apparatus for manufacturing clinker, comprising:
a kiln configured to bake raw meal to convert the raw meal into clinker, the kiln having an outlet for flue gases and a branch for flue gases configured to divert a portion of the flue gases to separate contaminants from the diverted portion of the flue gases, the contaminants including chlorides,
a raw meal preheater configured to heat the raw meal and to be connected to the outlet such that flue gases leaving the outlet enter the raw meal preheater, and
a first heat exchanger configured to pressurize a fluid using the heat generated in the kiln to subsequently expand the fluid in a turbine,
a hot gas dust separator having an inlet, and
a mixing chamber having a first inlet, a second inlet, and an outlet,
wherein
(i) the first inlet of the mixing chamber is configured to be connected to the branch such that the diverted portion of the flue gas is mixed with fresh air entering the mixing chamber through the second inlet such that the diverted portion of the flue gas is cooled down to 350° C. to 450° C. by said mixing,
(ii) a connection between the outlet of the mixing chamber and the inlet of the hot gas dust separator is configured to directly connect the outlet of the mixing chamber such that the hot gas dust separator will receive the diverted portion of the flue gases after being cooled down to 350° C. to 450° C., but not the nondiverted portion of the flue gas, and
(iii) an inlet of the first heat exchanger is configured to be connected to an outlet of the hot gas dust separator such that the first heat exchanger will receive the diverted portion of the flue gases after being dedusted in the hot gas dust separator and can transfer heat from the cooled and subsequently dedusted diverted portion of the flue gas to the fluid.

6. The apparatus according to claim 5, wherein the branch is configured to be connected to a mixing chamber to mix the diverted part of the exhaust gases with fresh air.

7. The apparatus according to claim 5 wherein the first heat exchanger is configured to be connected to the kiln such that exhaust gas leaving the first heat exchanger is fed to the kiln.

8. The apparatus according to claim 7 wherein the first heat exchanger is configured to be connected to a clinker cooler that is connected to the kiln, and the configuration of the clinker cooler and the connection between the first heat exchanger and the clinker cooler are such that the clinker cooler can blow flue gas coming from the first heat exchanger into the kiln.

* * * * *